(12) United States Patent
Shapiro (10) Patent No.: US 7,011,402 B2
(45) Date of Patent: Mar. 14, 2006

(54) EYEGLASSES HAVING MAGNETICALLY ATTACHED OUTER LENSES

(76) Inventor: Samuel R. Shapiro, 163 Urick La., Monroeville, PA (US) 15146

( * ) Notice: Subject to any disclaimer, the term of this patent is extended or adjusted under 35 U.S.C. 154(b) by 0 days.

(21) Appl. No.: 10/803,500

(22) Filed: Mar. 19, 2004

(65) Prior Publication Data
US 2005/0206836 A1 Sep. 22, 2005

(51) Int. Cl.
*G02C 7/08* (2006.01)
(52) U.S. Cl. .................. 351/57; 351/47; 351/110; 351/146
(58) Field of Classification Search ............. 351/47, 351/48, 57, 58, 110, 140, 142, 143, 145, 146
See application file for complete search history.

(56) References Cited
U.S. PATENT DOCUMENTS

| | | | |
|---|---|---|---|
| 6,170,950 B1 * | 1/2001 | Yoshida | 351/110 |
| 6,505,932 B1 * | 1/2003 | Xiao | 351/57 |
| 6,783,233 B1 * | 8/2004 | Xie | 351/47 |

* cited by examiner

*Primary Examiner*—Huy Mai
(74) *Attorney, Agent, or Firm*—Glenn E. Klepac (57) ABSTRACT

Eyeglasses of the invention include a pair of inner lenses, a nose bridge connecting the inner lenses, and at least one fastener means comprising a lens portion inserted into an opening defined by an inner lens. The lens portion connects with an end portion suited for attachment to a leg connected with an outer lens overlying one of the inner lenses. The end portion preferably comprises a material attracted to a magnet. In a preferred embodiment, a support arm extends laterally between the support arm and the end portion. Combination eyeglasses of the invention include a pair of outer lenses covering exterior surface portions of the inner lenses. The outer lenses include at least one rearwardly extending leg having a back portion connecting with a ferrous metal end portion. The back portion preferably includes a permanent magnet. In a preferred embodiment the eyeglasses also include end pieces attached to the inner lenses and supporting temples. The fastener means of the invention is positioned adjacent the nose bridge, adjacent the end pieces, or adjacent both the nose bridge and the end pieces.

11 Claims, 10 Drawing Sheets

EYEGLASSES HAVING MAGNETICALLY ATTACHED OUTER LENSES

1. FIELD OF THE INVENTION

The present invention relates to eyeglasses having a set of principal lenses and a set of auxiliary lenses attached to the principal lenses by magnets.

2. BACKGROUND OF THE INVENTION

Persons who wear eyeglasses often wish to attach auxiliary lenses over the principal lenses and to detach such auxiliary lenses when desired. For example persons whose eyeglasses have prescription lenses sometimes add auxiliary lenses in order to form sunglasses. The wearer may change the auxiliary lenses frequently, depending upon local conditions and the wearer's fashion needs. For such uses the auxiliary lenses must be easily mounted on the principal lenses and easily removed, as needed. It is also desirable that the auxiliary lenses be held securely in place on the principal lenses when mounted thereon so that the auxiliary lenses do not accidentally fall off. Such requirements are even more important for users involved in outdoor sports, strenuous labor, or other activities straining connections between the principal lenses and the auxiliary lenses.

Presently several types of mechanical connections are employed to hold a set of auxiliary lenses securely in place adjacent a set of principal lenses. However, mechanical attachments are often difficult and time consuming to operate, are subject to malfunction if parts of the mechanism are bent or otherwise damaged, and may even pose a danger of scratching surfaces of the principal lenses. Accordingly, a variety of magnetic devices have been developed for attaching auxiliary lenses to eyeglass lenses or to their frames.

Magnetic attachment mechanisms for auxiliary lenses are known in the prior art. Some patents disclosing magnetic attachments for eyewear are Chao et al. U.S. Pat. No. 6,012,811; Chao U.S. Pat. No. 6,199,981; Chen U.S. Pat. No. 6,293,672; and Xiang U.S. Pat. No. 6,478,420. However, there still remains a need for an improved magnetic attachment mechanism suitable for connecting auxiliary lenses to eyeglasses, and in particular for connecting auxiliary lenses to eyeglasses having rimless principal lenses.

A principal objective of the present invention is to provide an improved magnetic attachment mechanism for connecting auxiliary eyeglass lenses to principal eyeglass lenses.

A related objective of the invention is to provide a magnetic attachment mechanism suitable for attaching auxiliary eyeglass lenses to eyeglasses having rimless principal lenses.

Another objective of the invention is to conceal from view a magnetic connection between the auxiliary eyeglass lenses and the principal lenses.

An advantage of the invention is that the magnetic attachment mechanism of the invention permits the auxiliary lenses to be easily detached and removed, when the wearer so desires.

Additional objectives and advantages of the invention will become readily apparent to persons skilled in the art from the following specification and claims.

3. SUMMARY OF THE INVENTION

The present invention is directed to eyeglasses having a set of inner lenses suited for attachment to a set of outer lenses. The inner lenses are preferably rimless lenses. The outer lenses may be attached separately to the inner lenses or the outer lenses may be connected by a bridge attached to the inner lenses.

One embodiment of the invention is directed to a set of eyeglasses comprising a pair of inner lenses, a nose bridge connecting the inner lenses, at least one fastener means, and an end portion connected with an interior end of the fastener means.

The inner lenses may be made from glass or plastic and preferably comprise a polycarbonate. The inner lenses each include interior and exterior surface portions. Each inner lens defines at least one opening extending between the interior and exterior surface portions. Preferably each inner lens includes 2 pairs of laterally spaced through openings.

The nose bridge preferably comprises a titanium substrate covered by a plastic. A preferred nose bridge comprises an arch extending between the inner lenses and at least one stud extending from the arch into an opening in one of the inner lenses. More preferably, a pair of laterally spaced studs extends into a pair of laterally spaced openings in each inner lens. The nose bridge also supports a pair of nose pads.

The fastener means includes a lens portion extending into an opening defined by an inner lens. The fastener means comprises a metal or plastic material, preferably nylon. Suitable fastener means include metal and plastic screws and bolts, and plastic prongs. A preferred plastic prong includes a pair of laterally spaced hollow bushings and a bight connecting the bushings. The bushings are inserted into spaced openings and the bight is proximate to an interior surface of an inner lens. In a preferred embodiment, studs extending rearwardly from the nose bridge are inserted into the spaced nylon bushings.

The inner lenses preferably include a support arm extending laterally outward of the fastener means. The support arm may be metal or plastic. The support arm may be formed separately from the fastener means or integrally with the lens portion of the fastener means as a unitary structure. The support arm includes an end portion spaced from the lens portion. The end portion comprises a permanent magnet or a material attracted to a magnet. Such material may be steel, iron, or various combinations of iron with other metals such as nickel, chromium, cobalt, silver, and aluminum. The end portion is suitable for attachment to a leg extending rearwardly from an outer lens. Alternatively the entire fastener means including the end portion may comprise a material attracted to a magnet.

Combination eyeglasses are made by covering the inner lenses with a pair of outer lenses adjacent exterior surface portions of the inner lenses. The outer lenses are made from glass or plastic and are preferably tinted plastic so that the combination eyeglasses are sunglasses. The outer lenses may be rimless or have metal or plastic rims and are preferably rimless. The outer lenses are connected by a nose piece.

Outer lenses of the invention define at least one through opening extending between inner and outer surface portions of each lens. A fastener means is preferably inserted into each opening. The fastener means may be a plastic or metal screw or bolt or a prong. A particularly preferred fastener means is a nylon prong or sleeve having 2 spaced hollow bushings connected by a bight. The bushings are inserted into openings in a lens. The nose piece includes 2 studs extending rearwardly into the hollow bushings.

The nose piece supports at least one rearwardly extending leg including a back portion comprising a permanent magnet or a material attracted to a magnet. The back portion preferably includes a permanent magnet. The nose piece preferably supports 2 rearwardly extending legs that may be formed integrally with the nose piece or formed separately. In a particularly preferred embodiment a titanium nose piece and 2 titanium legs are formed separately and welded together.

The eyeglasses of the invention preferably include left and right temples attached to the left and right inner lenses by end pieces. In an alternative embodiment of the invention left and right end pieces each include at least one stud extending into a bushing on a fastener means. This embodiment also includes left and right support arms extending laterally outwardly from the inner lenses adjacent interior surface portions of the inner lenses. The support arms each have end portions comprising a magnet or a material attracted to a magnet, for attachment to rear portions of legs extending from the outer lenses. Yet another embodiment of the invention has 4 legs extending rearwardly of the outer lenses, including 2 legs connecting with support arms adjacent the nose piece and legs connecting with support arms adjacent the left end piece and the right end piece.

4. BRIEF DESCRIPTION OF THE DRAWINGS

The accompanying drawings show some particularly preferred embodiments of the invention as examples, with like parts bearing like reference numbers.

5. DETAILED DESCRIPTION OF PARTICULARLY PREFERRED EMBODIMENTS

Figure 1:
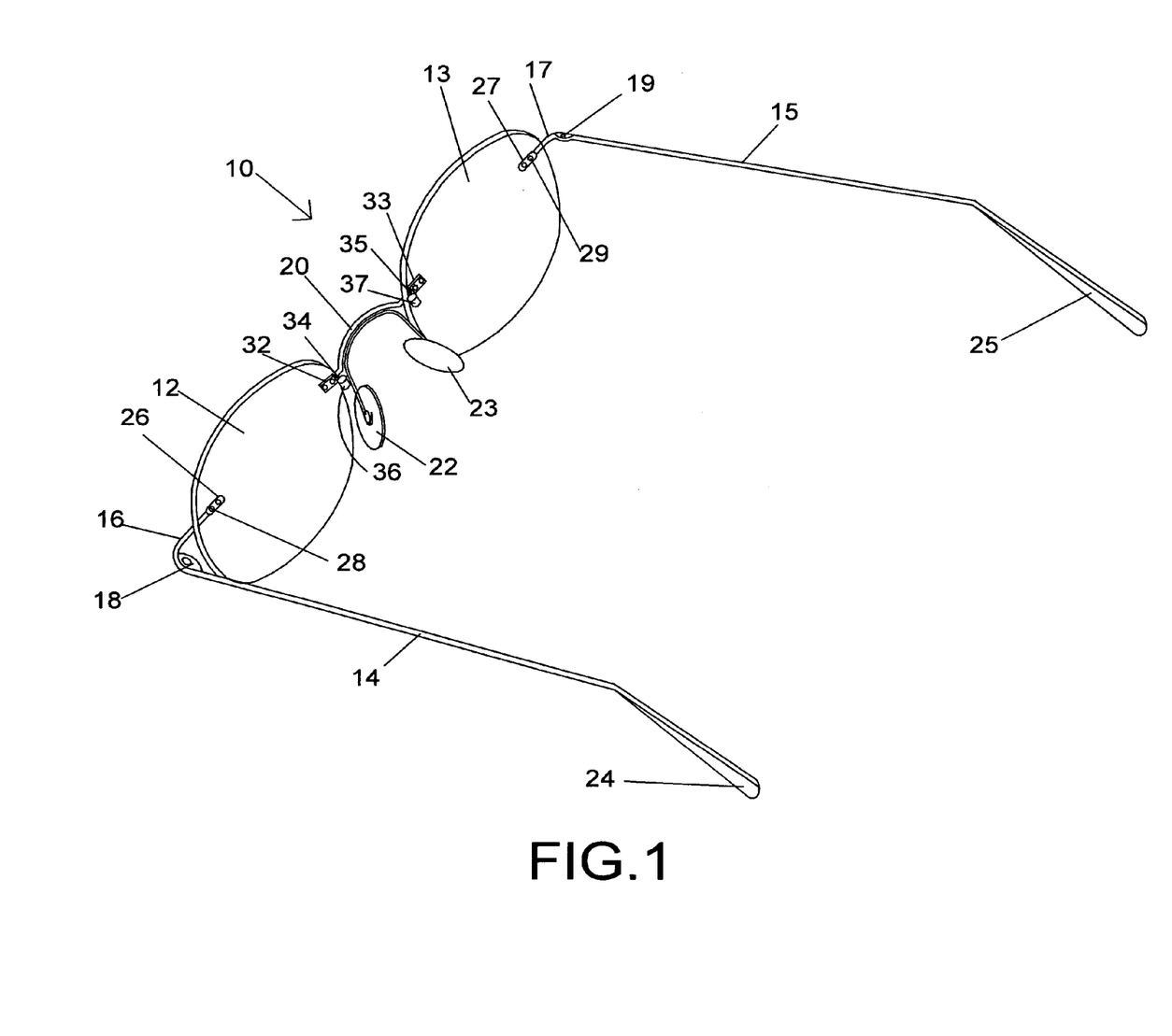
FIG. 1 is a perspective view of eyeglasses having a pair of inner lenses suited for attachment to outer lenses in accordance with the present invention.

As shown in FIG. 1, eyeglasses or primary eyeglasses 10 of the invention include a pair of inner lenses or primary lenses 12, 13. The inner lenses 12, 13 are preferably prescription lenses, manufactured in accordance with the specifications of an optician or an optometrist. The lenses 12, 13 are connected to left and right temples 14, 15 by left and right end pieces 16, 17 having hinges 18, 19 allowing the temples 14, 15 to be folded inwardly so that the eyeglasses occupy less space when not in use. A titanium nose bridge 20 connects the lenses 12, 13, as described in more detail below. The nose bridge 20 supports left and right silicone nose pads 22, 23.

The inner lenses 12, 13 are preferably made of a polycarbonate. The end pieces 16, 17 and hinges 18, 19 are preferably metal. The preferred temples 14, 15 are metal with plastic ear pads 24, 25. The end pieces 16, 17 each included a metal stud 26, 27 inserted into plastic prongs 28, 29 extending through openings defined by the lenses 12, 13.

The inner lenses 12, 13 also support plastic prongs 32, 33. The prongs 32, 33 are connected with support arms 34, 35 extending laterally inwardly from the prongs. Support arms 34, 35 each have an end portion 36, 37 comprising a material attracted to a magnet, preferably steel or other ferrous metal.

Figure 2:
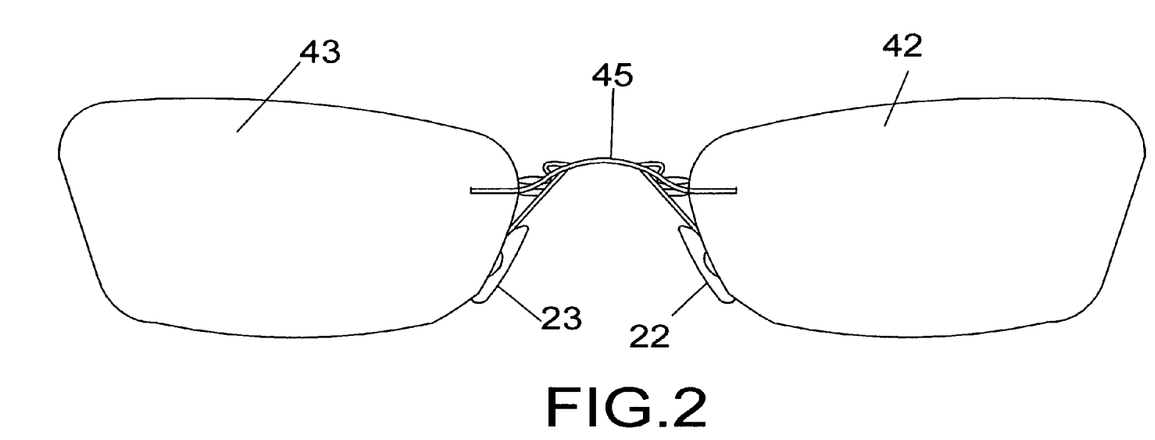
FIG. 2 is a front elevational view of a pair of outer lenses suited for attachment to the eyeglasses of FIG. 1.

Referring now to FIG. 2, there is shown a pair of rimless outer lenses or auxiliary lenses 42, 43 for attachment to the primary eyeglasses 10 of FIG. 1. The polycarbonate lenses 42, 43 are connected by a metal nose piece 45.

Figure 3:
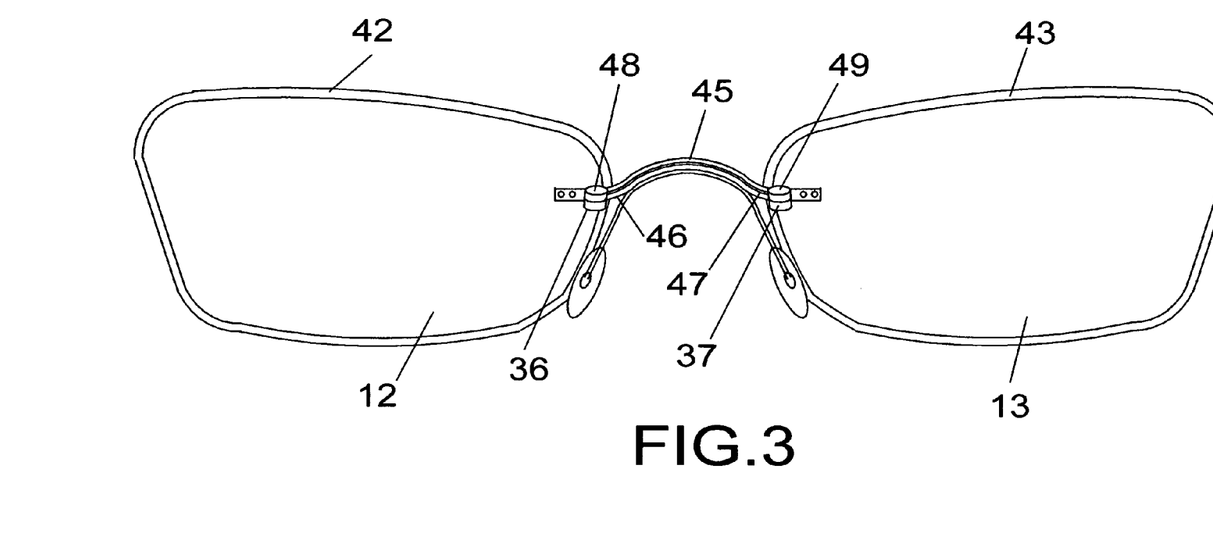
FIG. 3 is a rear elevational view of combination eyeglasses in accordance with the invention.
Figure 4:
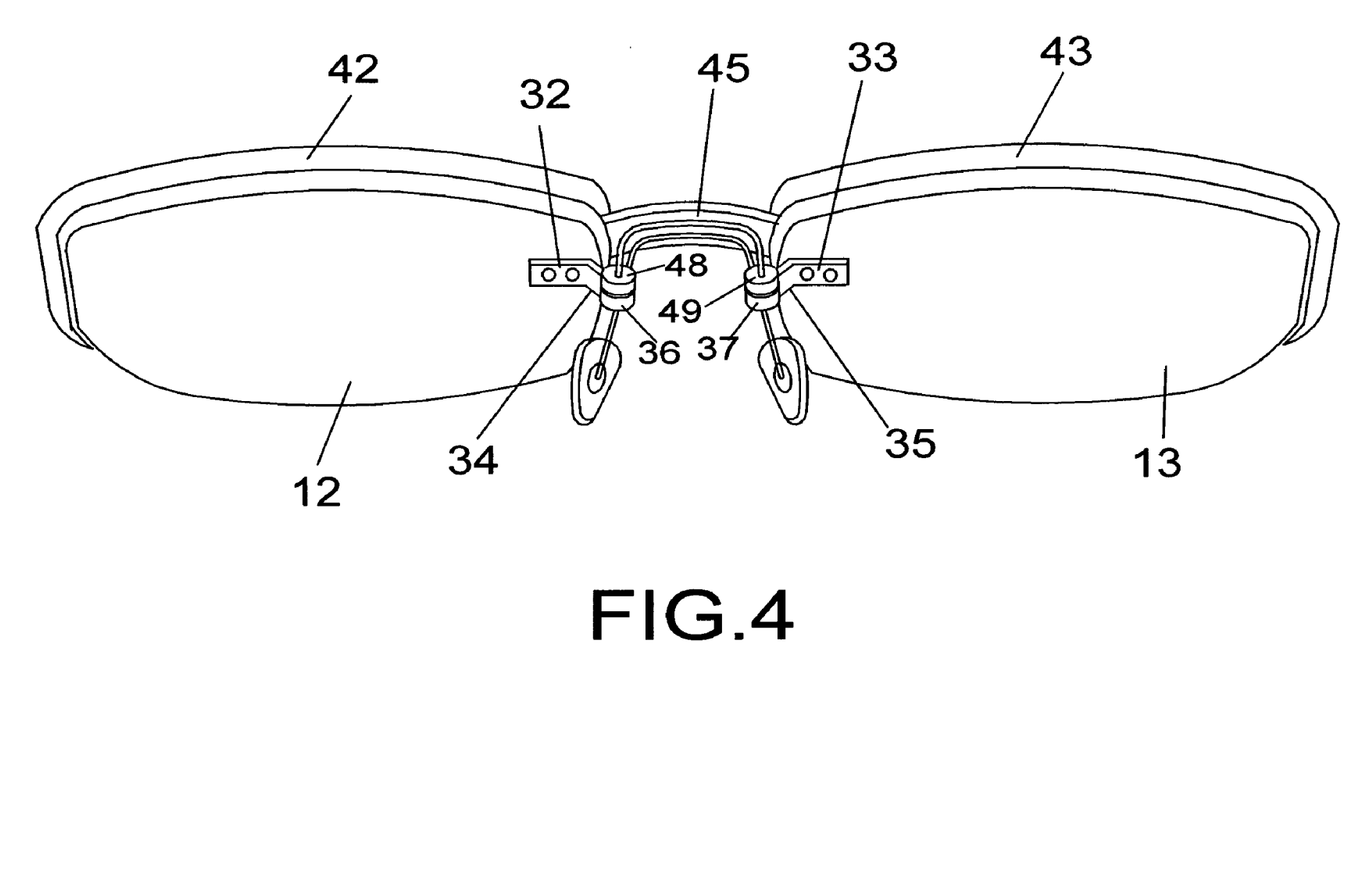
FIG. 4 is a perspective view of the combination eyeglasses of FIG. 3.
Figure 5:
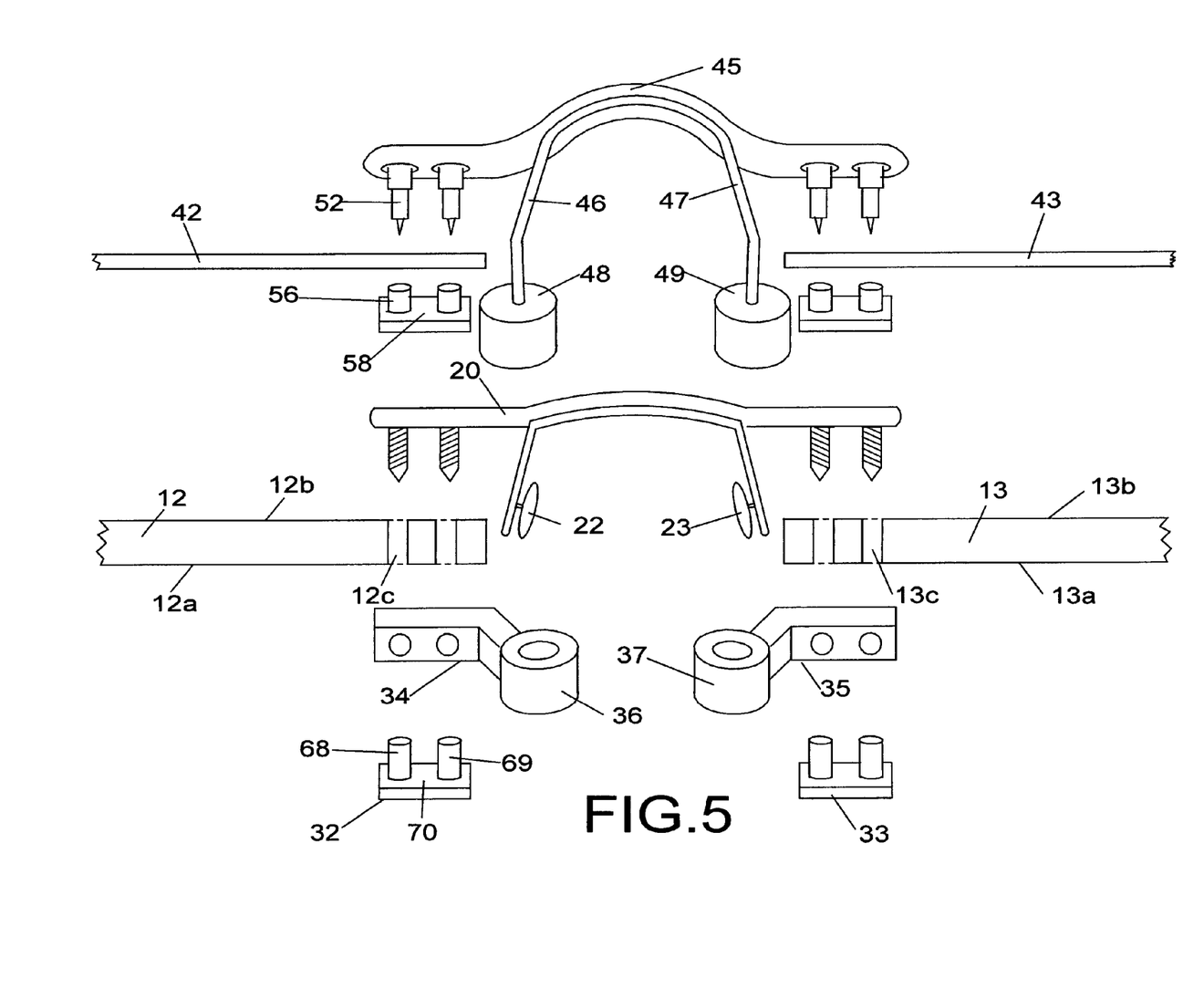
FIG. 5 is a fragmentary, exploded view of the combination eyeglasses of FIG. 3.

As shown in FIGS. 3–5, the outer lenses 42, 43 are suited for attachment to the inner lenses 12, 13. The nose piece 45 is welded to rearwardly extending legs 46, 47 each including an enlarged back portion 48, 49. In the preferred embodiment shown, the back portions 48, 49 are permanent magnets. Attachment of the back portions 48, 49 to end portions 36, 37 extending from the inner lenses 12, 13 is shown in FIGS. 3 and 4. The nose piece 45 includes rearwardly directed posts 52 extending through the outer lenses 42, 43. The posts 52 are inserted into hollow pressure sleeves 56 extending inwardly from a yoke 58 adjacent the lenses 42, 43, as shown.

FIGS. 4 and 5 show that the inner lenses 12, 13 each include inner surface portions 12a, 13a and outer surface portions 12b, 13b. The inner lenses preferably define pairs of laterally spaced through openings 12c, 13c extending between the inner and outer surface portions.

Figure 6:
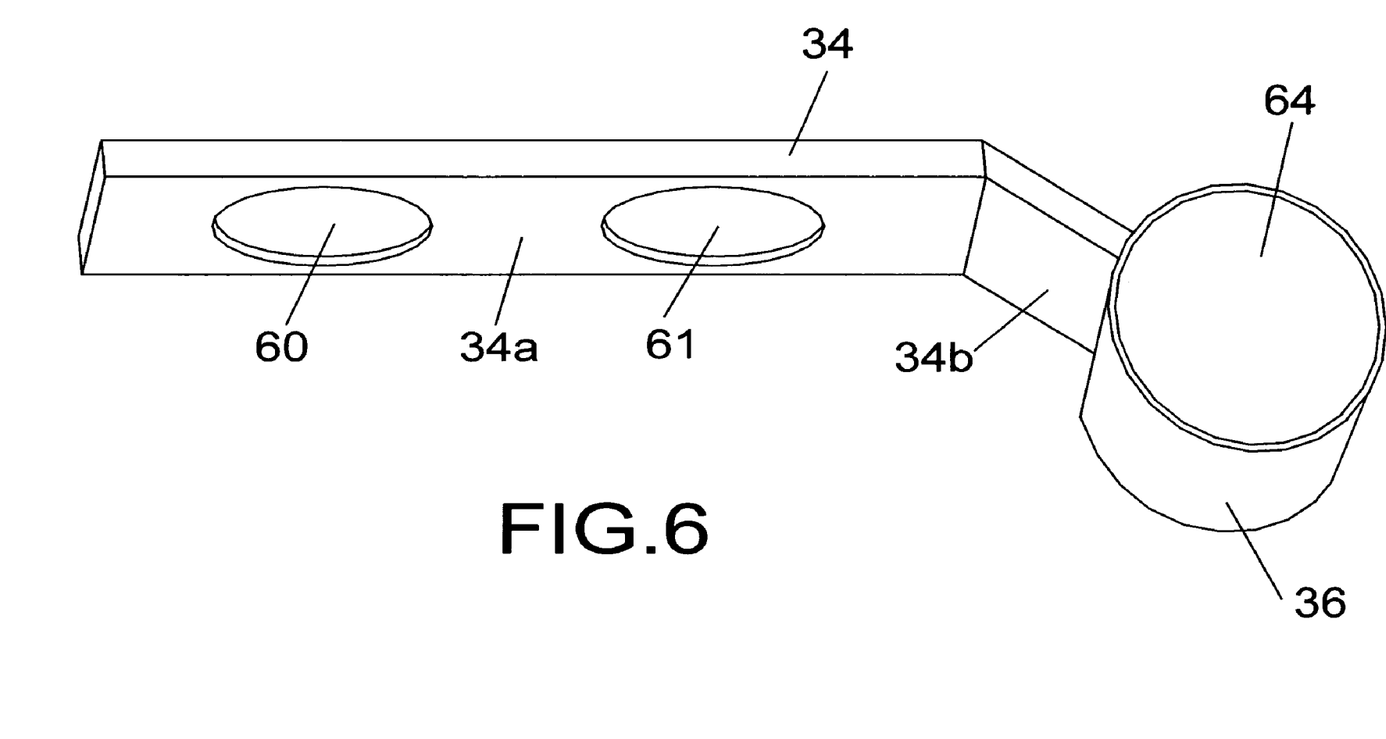
FIG. 6 is a perspective view of a particularly preferred support arm and end portion for attachment to the inner lenses of FIG. 1.

FIG. 6 is an enlarged perspective view of the left support arm 34 and end portion 36, also shown in FIGS. 3–5. The support arm includes a principal portion 34a defining 2 apertures 60, 61 and an angled portion 34b extending between the principal portion 34a and the end portion 36. The end portion 36 includes a ferrous metal top surface 64 attracted to a permanent magnet on a rear portion 48 of the outer lenses 42, 43. In the preferred embodiment of FIGS. 3–6, hollow sleeves 68, 69 connected by a bight 70 extend through the apertures 60, 61.

Figure 7:
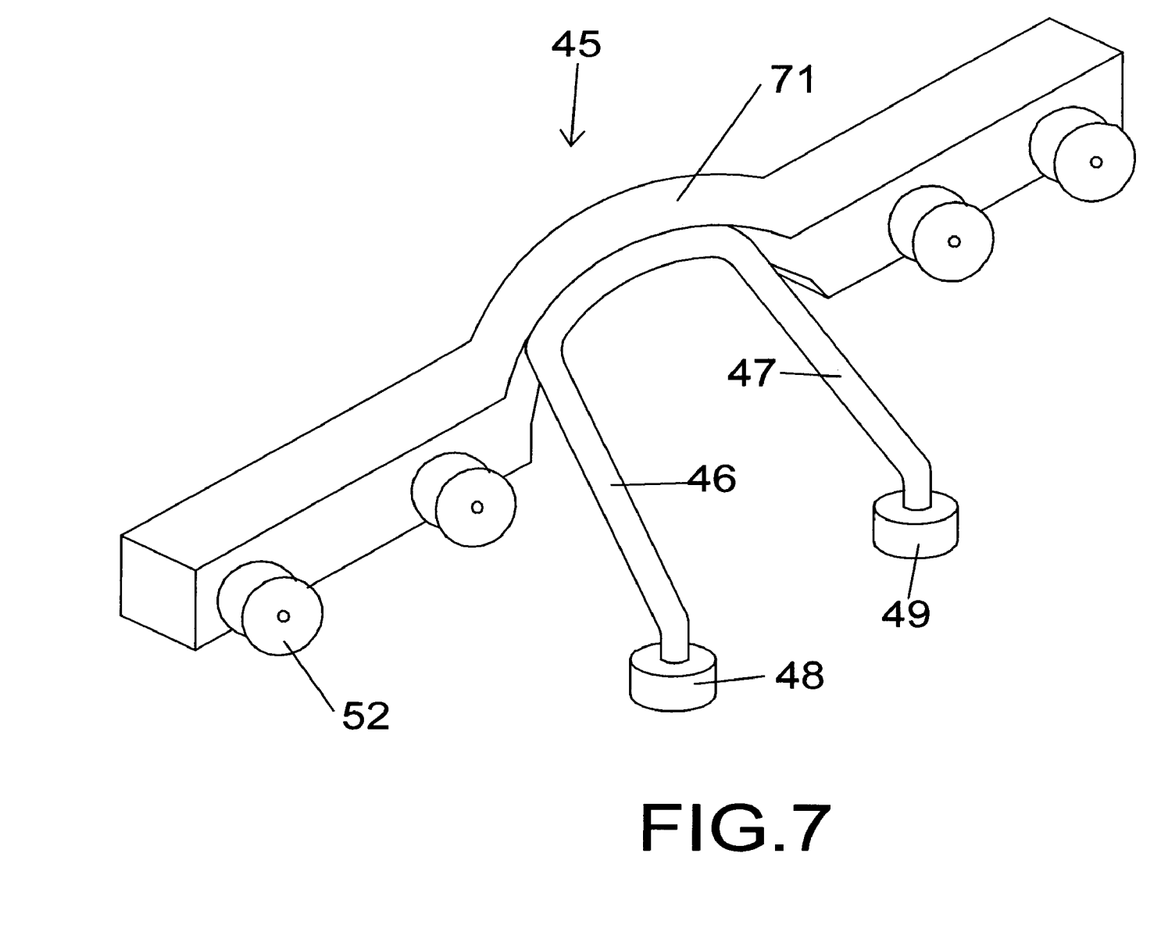
FIG. 7 is a perspective view of a particularly preferred nose piece for the outer lenses of FIG. 2.

FIG. 7 is an enlarged perspective view of the nose piece 45 also shown in FIGS. 3–5. The nose piece 45 includes an arch 71, rearwardly directed posts 52 for attachment to the outer lenses, and rearwardly directed legs 46, 47 welded to the arch 71. The legs 46, 47 have back portions 48, 49 that are permanent magnets.

Figure 8:
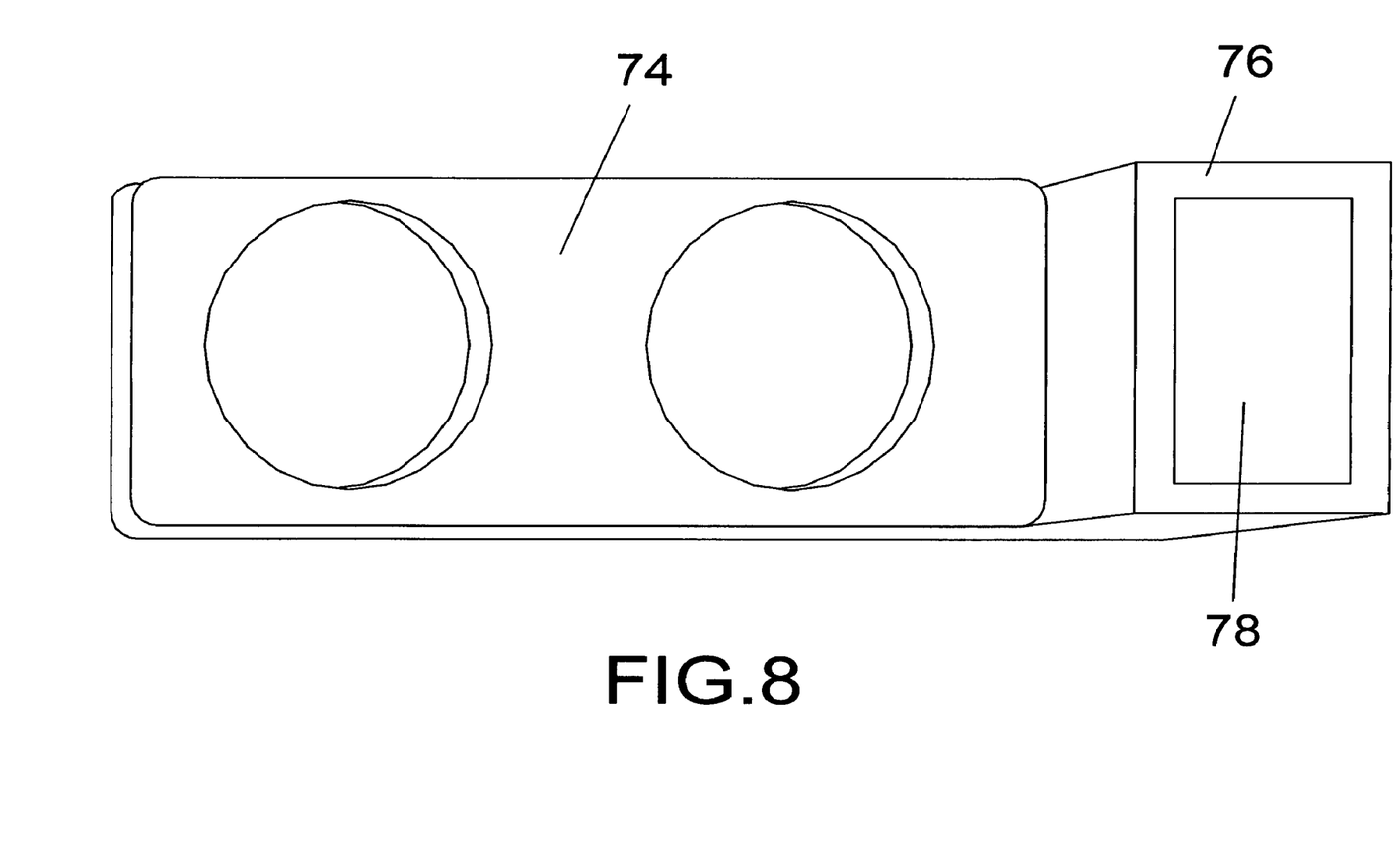
FIG. 8 is a perspective view of a support arm and end portion for attachment to the pair of outer lenses of FIG. 2.

FIG. 8 is an enlarged perspective view of an alternative embodiment of an attachment arm 74 and end portion 76 of the invention. The alternative embodiment shown is suitable for attachment to the inner lenses 12, 13 adjacent the end pieces 16, 17. The end portion 76 includes a ferrous metal front surface 78 for attachment to a permanent magnet supported by a leg (not shown) extending rearwardly from one of the outer lenses 42, 43 of FIGS. 2–5. The front surface 78 extends generally vertically when the attachment arm 74 is attached to an inner lens.

Figure 9:
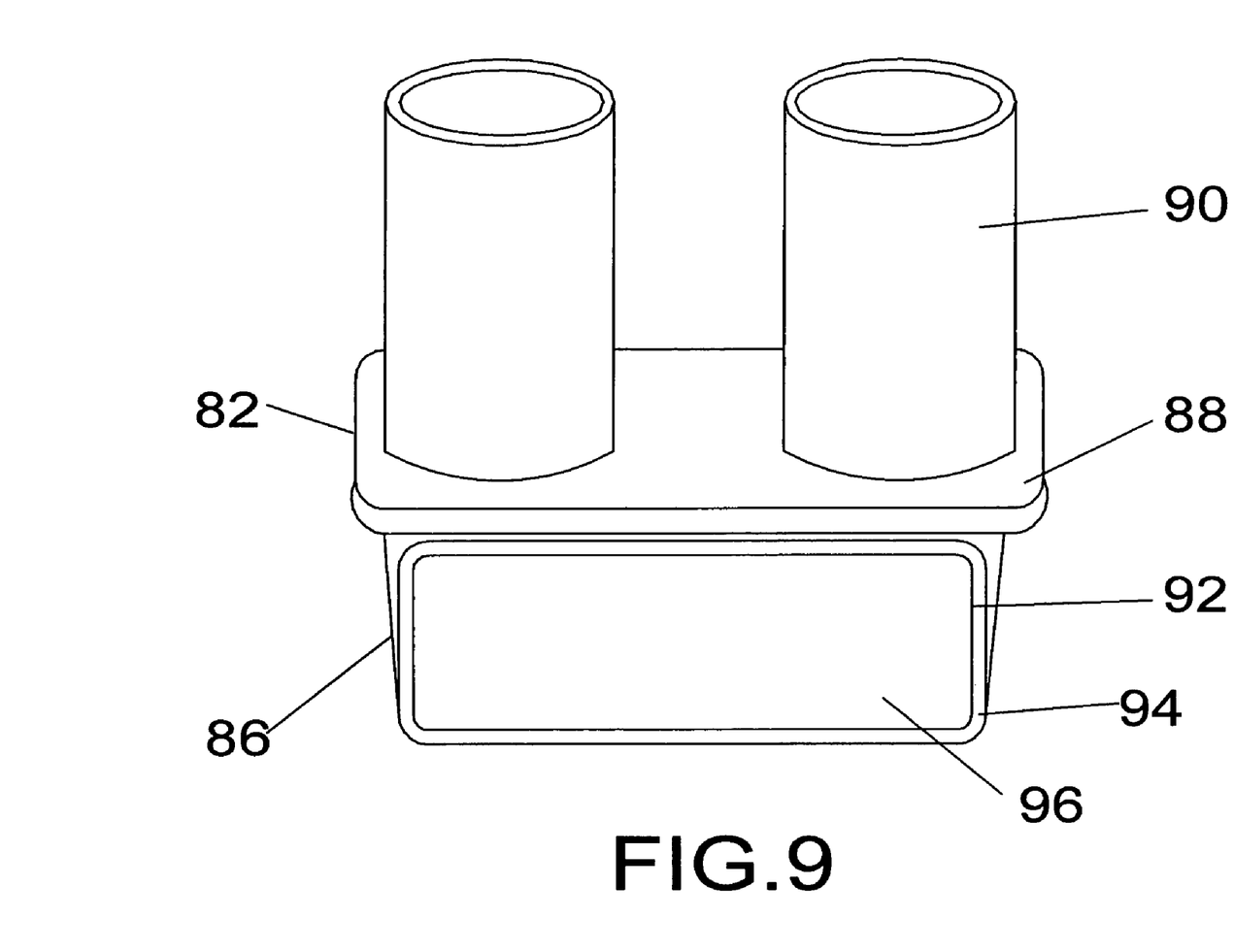
FIG. 9 is a perspective view of alternative embodiment of the invention.

FIG. 9 is an enlarged perspective view of an alternative embodiment of an integrally formed prong 82 and end portion 86 of the invention. The prong 82 includes a bight 88 joining 2 hollow sleeves 90. The end portion 86 includes a ferrous metal body 92 circumscribed by a casing 94. The ferrous metal body 92 has a top surface 96 for attachment to a permanent magnet supported by a leg (not shown) extending rearwardly from one of the outer lenses 42, 43 of FIGS. 2–5. The prong 82 and casing 94 may be metal or plastic and are preferably injection molded from nylon.

Figure 10:
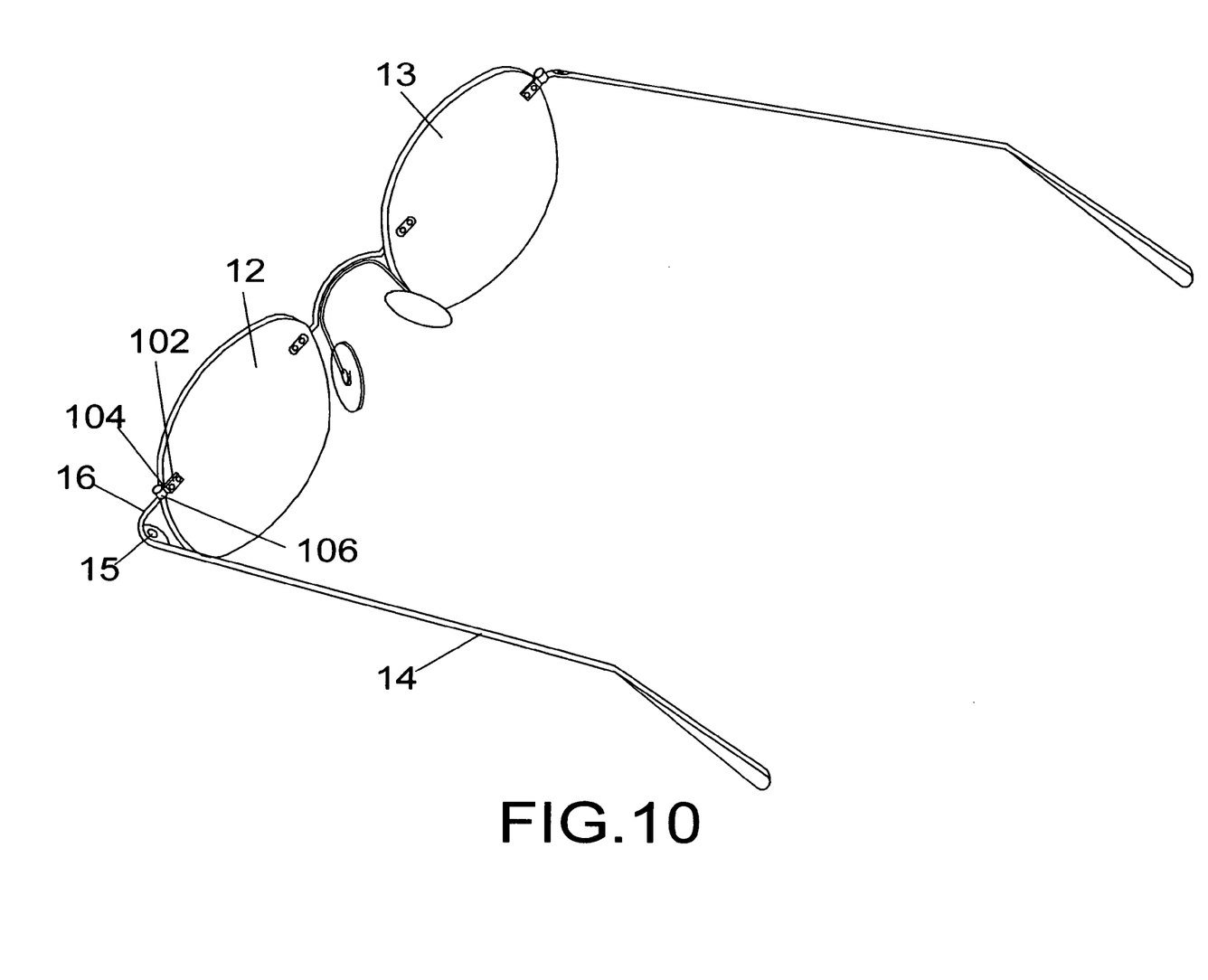
FIG. 10 is a perspective view of a different embodiment of the eyeglasses of the present invention.
Figure 11:
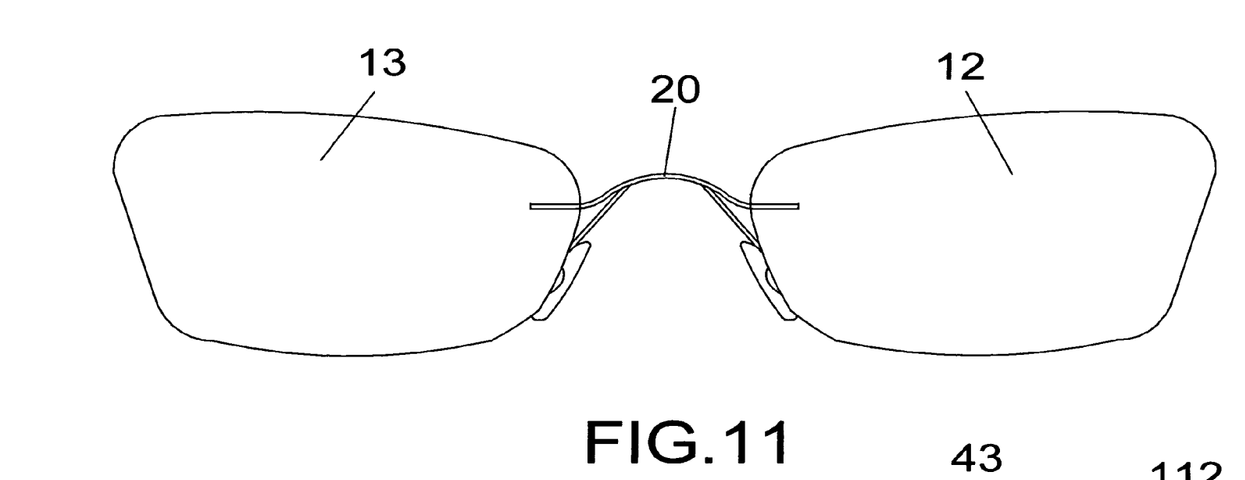
FIG. 11 is a front elevational view of the eyeglasses of FIG. 10.
Figure 12:
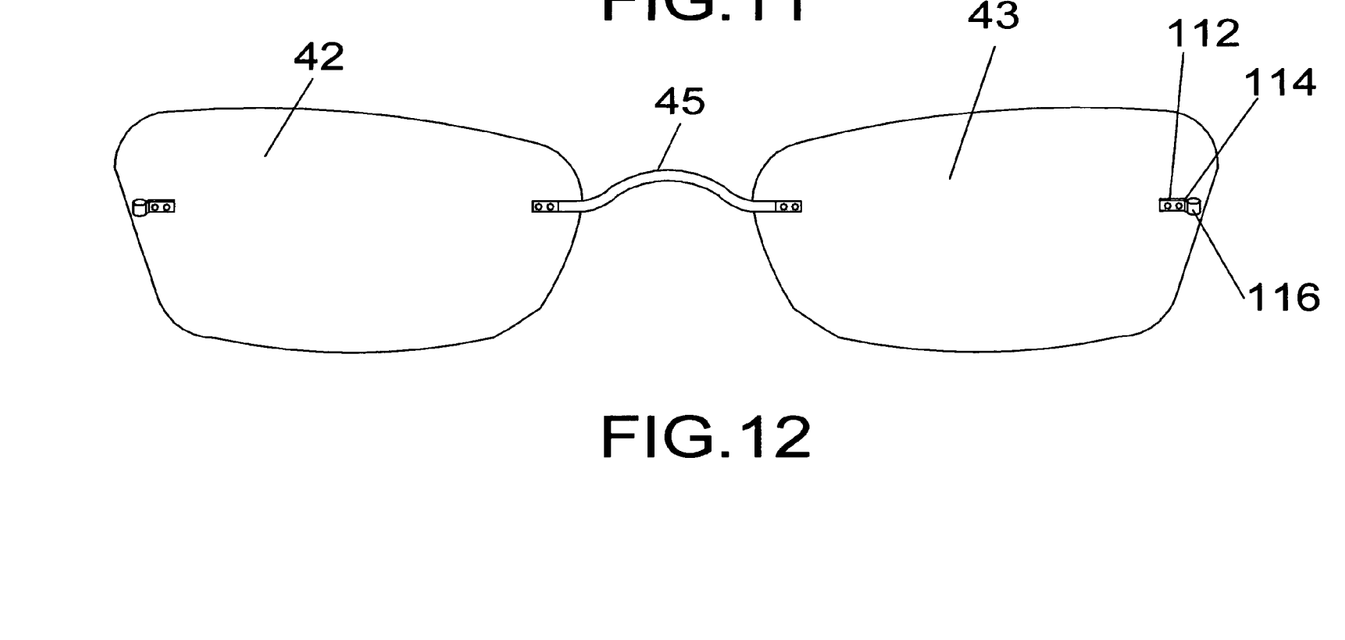
FIG. 12 is a rear elevational view of outer lenses suitable for attachment to the eyeglasses of FIG. 11.

Referring now to FIGS. 10–12 there is shown another embodiment of combination eyeglasses in accordance with the present invention. The combination eyeglasses include a set of rimless inner lenses 12, 13 as shown in FIGS. 10 and 11, suitable for magnetic attachment to the outer lenses 42, 43 of FIG. 12. The inner lenses 12, 13 support plastic prongs 102 connecting with support arms 104 having end portions 106 comprising a ferrous metal attracted to a magnet. The prongs 102 also support end pieces 16, hinges 15, and temples 14, as in the embodiment of FIG. 1.

The combination eyeglasses also include outer lenses 42, 43 as shown in FIG. 12. The outer lenses 42, 43 support plastic prongs 112 connecting with rearwardly extending legs 114 having back portions 116 preferably comprising permanent magnets. The back portions 116 connect with ferrous metal end portions 106 supported by the inner lenses 12, 13.

Although not shown in the drawings, yet another embodiment of the invention includes 4 legs extending rearwardly of the outer lenses, including 2 legs connecting with support arms adjacent the nose piece and 2 legs connecting with support arms adjacent to the end pieces. This embodiment requires 4 support arms extending from the inner lenses, including 2 support arms connecting with prongs adjacent the nose bridge and 2 support arms connecting with prongs adjacent the end pieces.

The foregoing detailed description of my invention has been made with reference to a few particularly preferred embodiments. Persons skilled in the art will understand that numerous changes and modifications may be pursued without materially departing from the spirit and scope of the invention defined by the following claims.

What is claimed is:

1. Eyeglasses comprising
   (a) a pair of inner lenses, said inner lenses each including an interior surface portion and an exterior surface portion,
   (b) a nose bridge connecting said inner lenses,
   (c) at least one fastener means comprising a plastic prong including a pair of spaced hollow bushings connected by a bight adjacent one of said inner lenses, said bushings extending into a pair of spaced openings defined by at least one of said inner lenses,
   (d) an end portion connected with said lens portion interiorly of said inner lenses, said end portion being suitable for attachment to a leg connected with an outer lens overlying one of said inner lenses, said end portion comprising a magnet or a material attracted to a magnet, and
   (e) a support arm connecting said plastic prong with said end portion, said support arm extending laterally outwardly of said plastic prong.

2. The eyeglasses of claim 1 wherein said support arm is adjacent to an interior surface of one of said inner lenses.

3. The eyeglasses of claim 1 wherein said fastener means and said support arm comprise an integrally formed, unitary structure.

4. The eyeglasses of claim 1 wherein said fastener means and said support arm are formed separately.

5. The eyeglasses of claim 1 wherein said nose bridge comprises an arch extending between said inner lenses and a stud extending from said arch into at least one of said bushings.

6. The eyeglasses of claim 1 wherein said nose bridge includes a pair of studs extending into said bushings.

7. The eyeglasses of claim 1 wherein said fastener means comprises a metal or plastic screw or bolt.

8. The eyeglasses of claim 1 further comprising:
   (f) a pair of outer lenses suitable for covering said exterior surface portion, each said outer lenses comprising a rearwardly extending leg including a back portion for attachment to said support arm, said back portion comprising a magnet or a material attracted to a magnet.

9. The eyeglasses of claim 1 further comprising:
   (g) a pair of temples carried by said inner lenses.

10. The eyeglasses of claim 9 wherein said fastener means includes at least one prong including a support arm extending laterally outwardly of a pin connected with at least one of said temples, said support arm supporting an end portion for attachment to a leg connected with an outer lens adjacent said exterior surface portion, said end portion comprising a magnet or a material attracted to a magnet.

11. The eyeglasses of claim 1 wherein said inner lenses are rimless.

* * * * *